(12) United States Patent
Wickholm

(10) Patent No.: US 7,502,117 B1
(45) Date of Patent: Mar. 10, 2009

(54) INTERFEROMETER WITH GHOST SUPPRESSION

(75) Inventor: David Randall Wickholm, Fort Wayne, IN (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 401 days.

(21) Appl. No.: 11/296,238

(22) Filed: Dec. 7, 2005

(51) Int. Cl.
*G01B 9/02* (2006.01)
(52) U.S. Cl. ........................................ 356/450; 359/637
(58) Field of Classification Search ................. 356/451, 356/496, 450; 359/629, 631, 637, 583, 633
See application file for complete search history.

(56) References Cited

U.S. PATENT DOCUMENTS

| | | | | |
|---|---|---|---|---|
| 4,735,505 A | * | 4/1988 | deMey et al. ................ | 356/451 |
| 5,847,828 A | * | 12/1998 | Downs ........................ | 356/451 |
| 6,233,054 B1 | * | 5/2001 | Theriault ..................... | 356/451 |
| 6,989,901 B2 | * | 1/2006 | Abbink ........................ | 356/451 |
| 2003/0107746 A1 | * | 6/2003 | Hedin et al. ................. | 356/519 |
| 2003/0189709 A1 | * | 10/2003 | Maynard et al. ............. | 356/451 |

* cited by examiner

*Primary Examiner*—Tarifur Chowdhury
*Assistant Examiner*—Jonathan M Hansen
(74) *Attorney, Agent, or Firm*—Ratner Prestia

(57) ABSTRACT

An interferometer includes a beamsplitter, and a compensator. At least one surface of the beamsplitter or compensator has a non-zero power. In one embodiment, one surface of the beamsplitter is flat and the other surface of the beamsplitter is curved. In another embodiment, the interferometer includes a beamsplitter and a compensator, each having at least one surface of non-zero power, and the non-zero power of the beamsplitter and the non-zero power of the compensator are equal to each other.

14 Claims, 6 Drawing Sheets

INTERFEROMETER WITH GHOST SUPPRESSION

FIELD OF THE INVENTION

The field of the invention is interferometry. More specifically it is in the field of suppression of ghosts in interferometers.

BACKGROUND OF THE INVENTION

Interferometer ghosts are of concern for a number of reasons. First, pairs of reflections form low finesse etalons and imprint a rapidly oscillating transmission pattern on scene energy. Typical infra-red interferometer components give rise to an etalon fringe spacing that is comparable to the required spectral resolution of sensors used to detect the interference pattern. FIG. 1, for example, shows the transmission function for an etalon made from 10 mm of ZnSe at normal incidence. The surface reflectances are 50% and 3%. The period of the oscillation is 0.21 cm$^{-1}$. A 5 mm plain parallel air gap would have an etalon period of 1.0 cm$^{-1}$.

FIG. 2 shows further details of common ghost paths and their normalized intensities. In this figure, R1 and R2 are surface reflectances, P1 and P2 are primary image paths, and T1 and Rext are common ghost paths.

Very small changes in temperature may cause significant changes in the internal optical path lengths that create the etalons. If changes in optical path length occur between calibrations, the transmission patterns of the etalons shift and result in radiometric errors. A compensated Michelson interferometer, for example, has 4 potentially parallel surfaces (2 surfaces of the beamsplitter and 2 surfaces of the compensator) resulting in 6 pairs that may form etalons. Keeping the total radiometric error well below 1% requires keeping the temperature of the interferometer components constant to a fraction of 1° K.

A second problem occurs when the interferometer plates are wedged and tilted to destroy the constructive interference that produces an etalon. When none of the 4 surfaces of a compensated Michelson interferometer are mutually parallel, internal reflections deviate the ghost image away from the primary image. When such an interferometer views a scene, a second, fainter and displaced image of the scene is superimposed on the first image. Low radiance features in the scene may become contaminated by the overlying ghost image of a high radiance feature at some distance from the point of interest. This effect cannot be calibrated away. Because a blackbody has a uniform temperature and, therefore, is without any structure to view, a blackbody ghost is indistinguishable from the primary image. Furthermore, the presence of a prominent, in-focus ghost, at a distance from the primary image, may affect detector optics ensquared energy (DOEE) performance.

FIG. 3 shows output angles of ghost ray paths when two surfaces are not parallel. The angular offsets of the ghosts from the primary image are A3-A1 for the transmitted path and A2-A for the reflected path.

A third problem related to ghost images concerns the IR background energy levels. It is common to cool portions of IR radiometers in order to reduce the self emission of the sensor and drive photon shot noise down. This only works when the IR background originates within the cooled portion of the sensor. In an interferometer, on the other hand, the ghost reflections do not terminate on an interferometer housing. Running the rays "backwards" to determine what surface the detector "sees" reveals that the ghost paths do not permit the detector to see the instrument at all. The rays are found to originate within the scene itself. So cooling the interferometer only reduces emission from the mirrors and coated substrates and this turns out to be only 10-30% of the ghosted scene emissions depending upon the wavelength in question. The interferometer components' self emission is greater in the long wavelength (LW) range, where substrate and coating absorption becomes significant. These scene ghosts are the dominant source of unwanted background flux in a cooled Fourier transform spectrometer (FTS) based sensor.

Strong ghost images can result whenever two planar optical surfaces are in close proximity. Therefore, optical windows and beamsplitters commonly produce ghost images. For a predetermined application of a specific interferometer there may be a maximum acceptable magnitude of ghost images. If the actual magnitude of a ghost image is found to exceed this maximum, the ghost magnitude must be reduced. Strategies for reducing ghost magnitude include the use of high efficiency anti-reflection (AR) coatings where possible, wedging components to eliminate favorable etalon producing interference conditions, and judicious choice of wedge and tilt angles so the ghost image is driven into a wall.

In the case of interferometer ghosts, however, there are some complicating factors. First, the beamsplitting surface is, by necessity, a nearly 50% reflector. Also, AR coatings become less efficient as the spectral range increases and as the angle of incidence increases. One type of interferometer has a 45 degree incident angle and can operate from about 4 to about 15 microns. With an average AR reflectance of 4%, the two ghost ratios are 0.02 and 0.0868 for the transmitted and reflected paths, respectively.

The strong reflected path ghost is a serious concern, as it may be a source of radiometric error and/or a violation of ensquared energy performance requirements. Driving it lower can only be achieved with a better AR coating. Reducing the reflectance of the coating may be achieved in two ways. First, reducing the incidence angle from, for example, 45 to 30 degrees, probably enables reflectances near 3%. Secondly, reducing the spectral range over which the coating operates enables further reflectance reduction, assuming that it satisfies the intended use of the interferometer. For example, one use allows the operating spectral range to be reduced from about 4 to about 9 microns. With this reduction, coupled with a lower incident angle, reflectances in the 1.6-2% may be achievable. Using a two-interferometer design, in which two bands are separated (e.g. MW from about 6 to about 9 microns and SW from about 4.2 to about 4.7 microns) may make about 1% reflectance within the realm of possibility. Reducing the reflectance may reduce the magnitude of the etalon peaks, reduce the radiometric errors and reduce the IR background.

Wedging the interferometer plates may greatly reduce the peak-to-valley (P-V) variation of the etalon transmission pattern. An IR ghost still exists, but the constructive interference from multiple reflections that gives rise to the etalon is reduced to arbitrarily small values. One interferometer (referred to herein as A) incorporates a 100 microradian wedge in its beamsplitter and compensator. Another interferometer (referred to herein as B) incorporates a 1.2 milliradian wedge, and a possible air wedge of 3.8 milliradians. The difference between the two interferometers is due to the much larger field of view (FOV) of each sensor (0.963 degree) used in interferometer A. Considerable self apodization occurs and contributes nearly a ten times reduction in the etalon peak-to-valley variation. Thus, interferometer A only needs a little help to drive the etalon into the noise. The FOV of interferometer B is 0.0448 degree (782 microradians). Very little self apodization is the result in interferometer B, so a much larger wedge is required to defeat the etalon.

While these angles may reduce the etalon pattern, they may cause other undesirable effects. The wedges are great enough that their chromatic aberration may require compensation elsewhere in the optical system with a window wedged in the opposite direction. Additionally, the interferometer components in interferometer B introduce approximately 1.4% anamorphic magnification. The counter wedge may partially reduce the aberration depending upon its location and tilt.

The wedges in interferometer B may also produce ghost images that are 0.4492 and 0.4476 degrees (approximately 7.8 milliradians) from the transmitted and reflected primary image path, respectively. The air wedge causes a ghost that is 2×3.8=7.6 milliradians away. If used in certain sensors, this corresponds to a 10 FOV separation of the primary image from the ghost image at the focal planar array (FPA). There may be other weaker second generation ghosts at roughly twice this spacing, and ghosts caused by reflections between non-adjacent surfaces at larger separations.

Interferometer A does not need to be concerned about these ghost images, because the images appear approximately 0.03 degree offset from the primary image—only 3% of a FOV width away. The only effect of the ghost may be to broaden the FOV response tail very slightly. Chromatic aberration and anamorphism are <10% of that of interferometer B.

Many of the ghost images produced from interferometer B, though stronger and further offset from those produced by interferometer A, are basically DC terms. The optical path lengths are considerably different than the primary imaging optical path length. However, a full analysis of the optical paths of the most prominent ghosts has not been performed. There are several ghost paths that have equal optical path "mates" in the other arm of the interferometer. These paths, though generally longer than the primary path, interfere with each other at zero path difference (ZPD) and add to the primary AC signal.

SUMMARY OF THE INVENTION

To meet this and other needs, and in view of its purposes, the present invention provides an interferometer including a beamsplitter, and a compensator. At least one surface of the beamsplitter or compensator has a non-zero power. In one embodiment, one surface of the beamsplitter is flat and the other surface of the beamsplitter is curved.

In another embodiment, the interferometer includes a beamsplitter and a compensator, each having at least one surface of non-zero power, and the non-zero power of the beamsplitter and the non-zero power of the compensator are equal to each other. The beamsplitter may include one surface having non-zero power and another opposing surface having zero power, and the compensator may include two opposing surfaces each having non-zero power. The combined non-zero power of the beamsplitter and the combined non-zero power of the compensator are equal to each other.

In still another embodiment, the interferometer includes a beamsplitter having opposing input and output surfaces, the input surface having a curvature $C_{bs}$, where $C_{bs}$ is the reciprocal of $R_{bs}$, and $R_{bs}$ is the radius of curvature of the input surface. Also included is a compensator having two opposing curved surfaces of C1 and C2, respectively, where C1 and C2 are the reciprocals of the respective radii of curvature of the two opposing curved surfaces. The following relationships are provided: $\phi_{bs}=\phi_{cp}$ where $\phi_{bs}$ is the power of the beamsplitter and $\phi_{cp}$ is the power of the compensator, and $\phi_{bs}=(n_{bs}-1)C_{bs}$ and $\phi_{cp}=(n_{cp}-1)(C1-C2)$, where n is the refractive index of the beamsplitter (bs) or the compensator (cp).

It is understood that the foregoing general description and the following detailed description are exemplary, but are not restrictive, of the invention.

BRIEF DESCRIPTION OF THE DRAWINGS

The invention is best understood from the following detailed description when read in connection with the accompanying drawing. Included in the drawing are the following figures.

DETAILED DESCRIPTION OF THE INVENTION

An approach to reducing ghosts in an interferometer is to include in the interferometer at least one surface having non-zero power, such as a weak spherical surface, cylindrical surface, or other non-flat surface. A non-flat surface may be considered a surface having at least one region that is convex or concave, not planar. Surfaces with non-zero power are included in a way that power, aberration, or both are sufficiently matched in all interferometer arms, to match the wavefronts of both paths to an acceptable level. If power, aberration, or both are sufficiently matched in all arms of the interferometer, the wavefronts in the various arms of the interferometer are made to interfere with each other and provide high contrast interference fringes with reduced intensity ghosts.

As will be explained, suppression of ghosts may be accomplished if equal, non-zero amounts of power are added to both beamsplitter and compensator of an interferometer. "Power", in general, refers to the degree to which an optical device alters the paths of light rays. A more specific example of power refers to a property of an interface between two optical media. For a medium of refractive index n immersed in air (with an assumed refractive index of 1), the power of the air-medium interface is (n−1)C, where C is the reciprocal of the radius of curvature of the interface and may be positive or negative. A lens, for example, has two interfaces, each having its own power, and the power of the lens in a "thin lens" approximation is an algebraic sum of the powers of the two interfaces.

Figure 1:
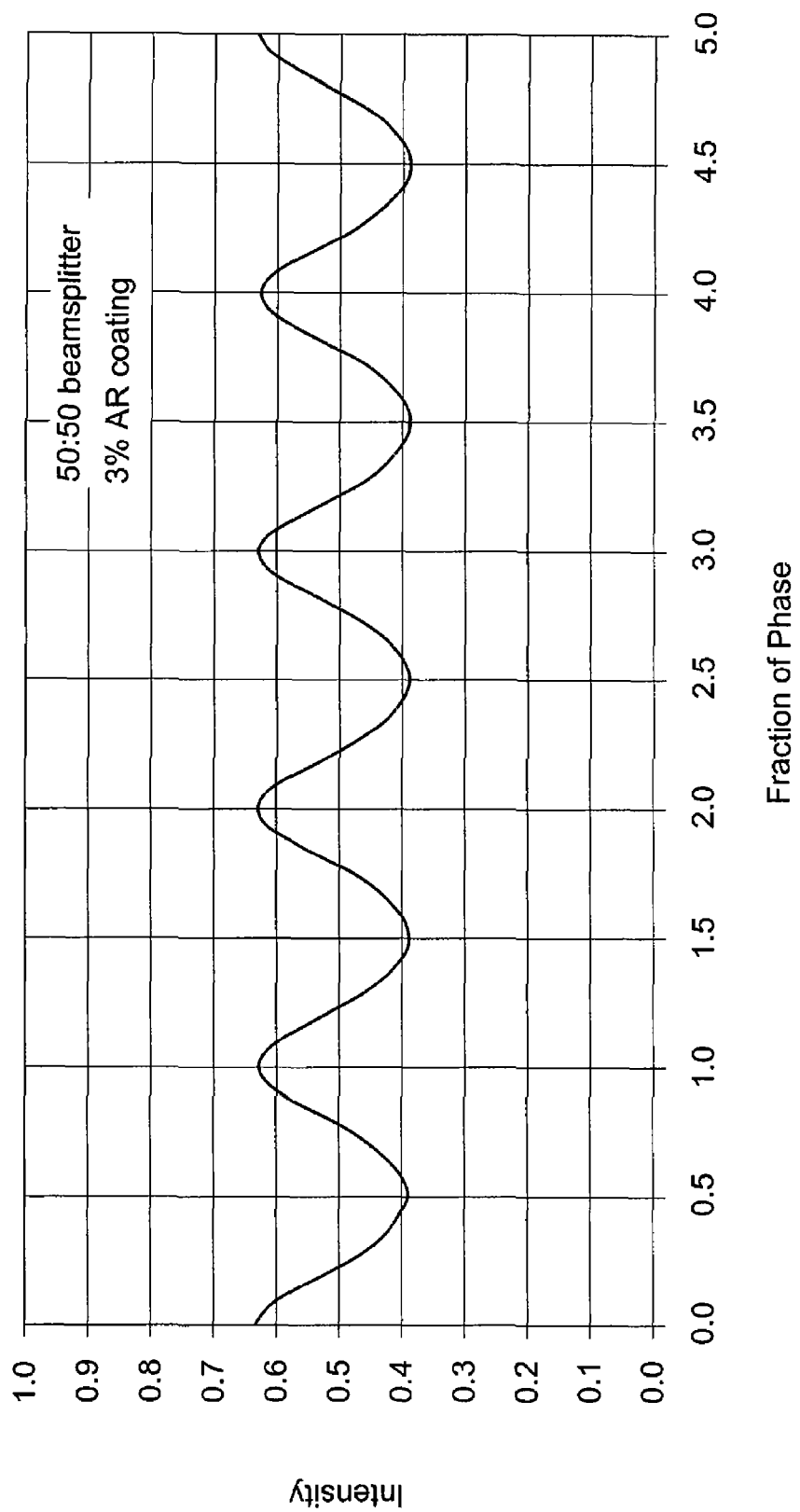
FIG. 1 shows a transmission function for an etalon, in terms of intensity versus fraction of phase.
Figure 2:
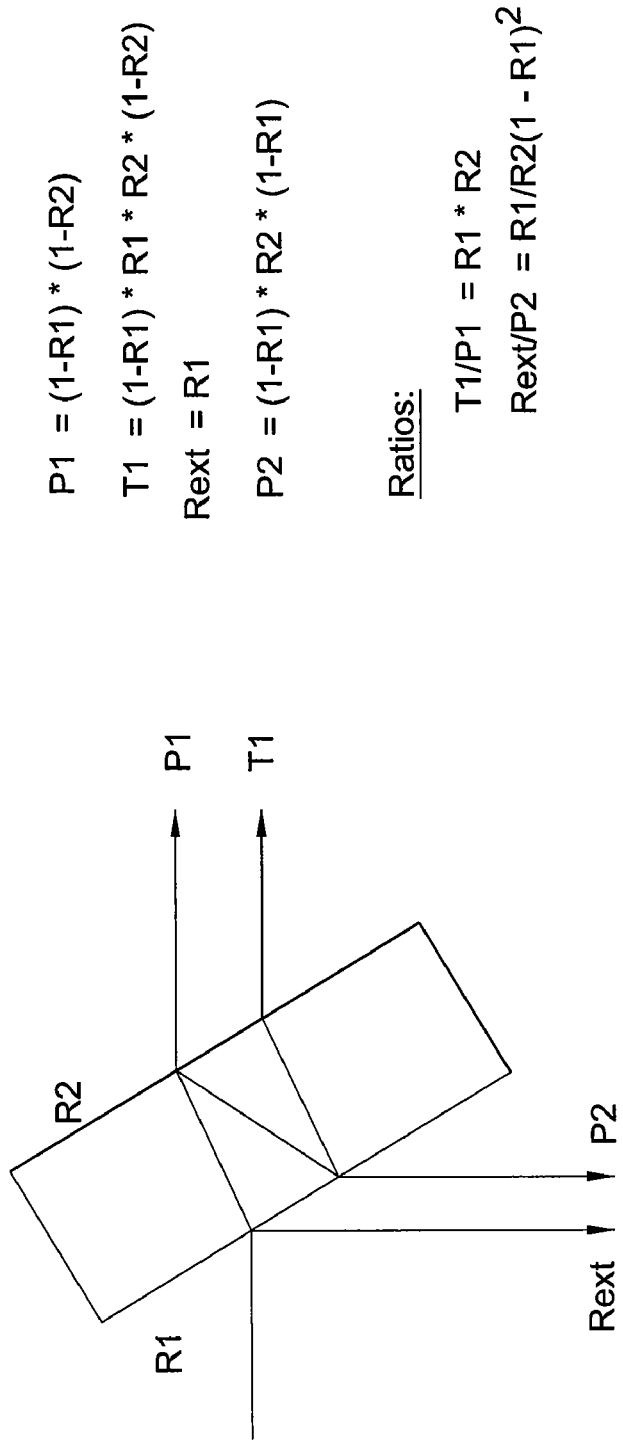
FIG. 2 shows details of common ghost paths and their normalized intensities for parallel surfaces.
Figure 3:
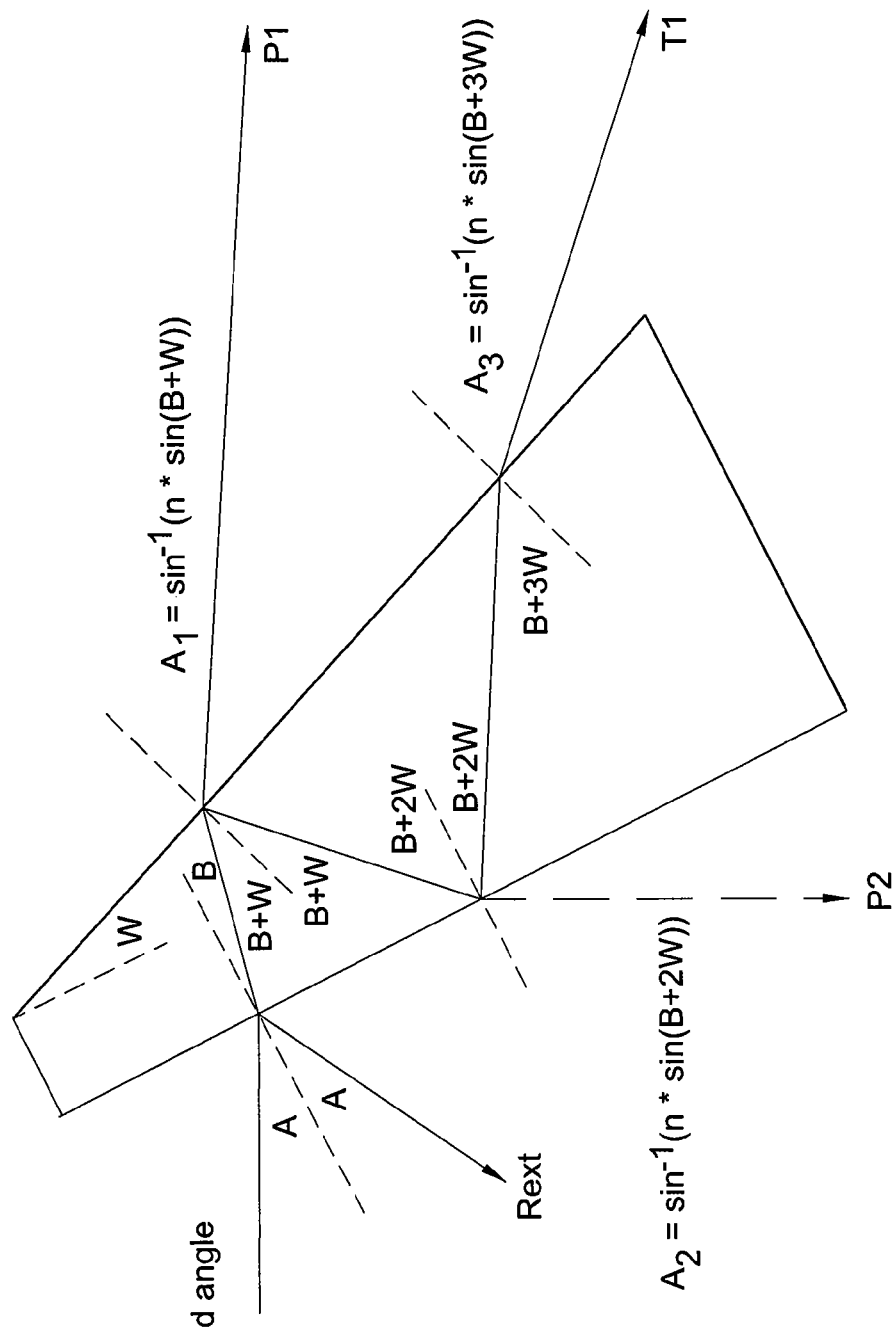
FIG. 3 shows angles of common ghost paths at two non-parallel surfaces.
Figure 4:
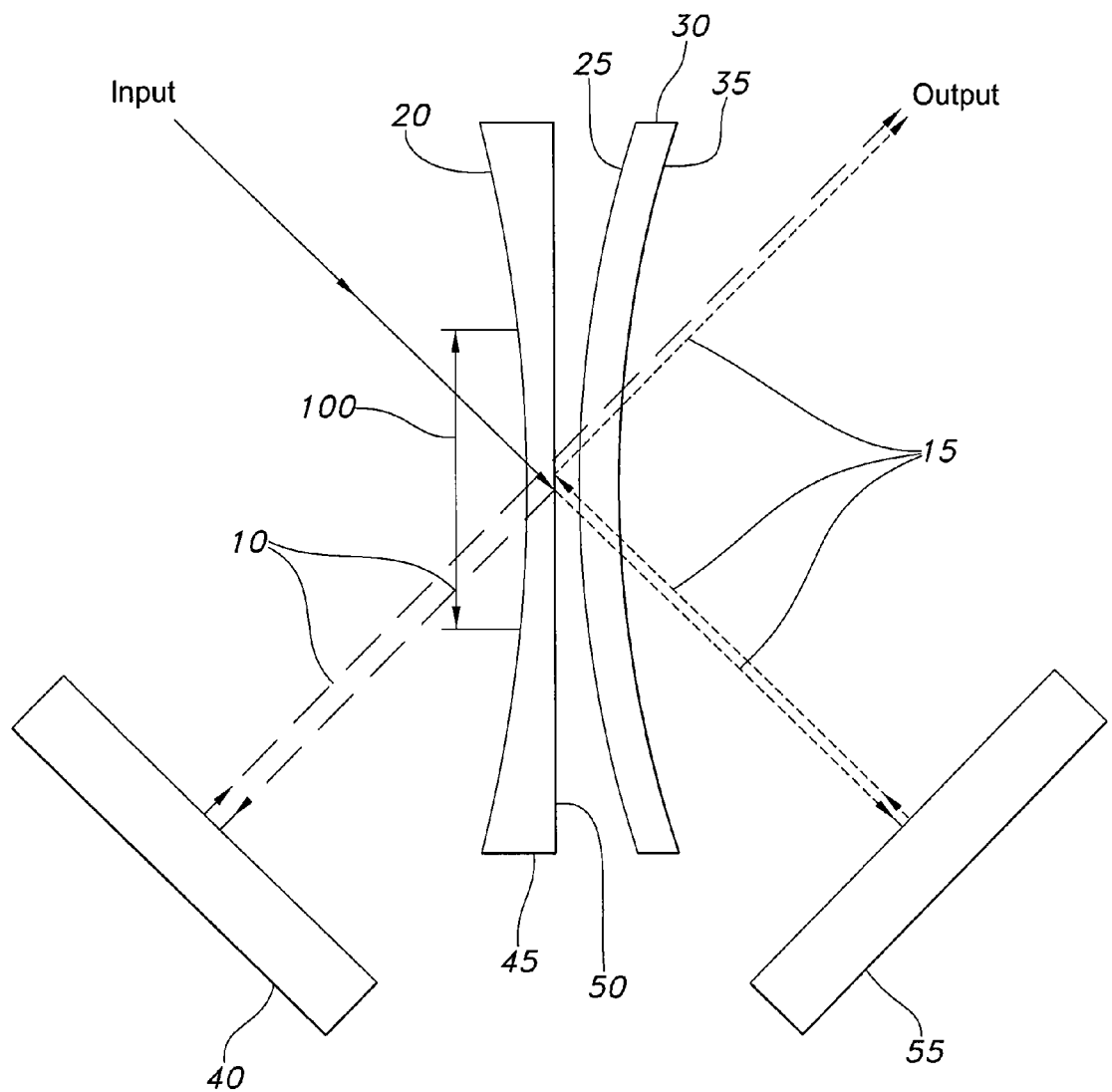
FIG. 4 shows portions of an interferometer including a beamsplitter and a compensator having non-zero power, resulting in reduced ghost image formation, in accordance with an embodiment of the invention.

FIG. 4 shows one embodiment of the present invention having an interferometer with non-zero power. The interferometer includes beamsplitter 45 and compensator 30. The beamsplitter 45 has input surface 20 and beamsplitting surface 50, disposed in opposing relationship to each other. As shown, input surface 20 is curved having a concave surface with respect to the input light rays. The beamsplitting surface 50, on the other hand, is flat. The input surface, therefore, provides a surface having non-zero power.

The compensator 30 includes first surface 25 and second surface 35 disposed in opposing relationship to each other. As shown in FIG. 4, first surface 25 is disposed between beamsplitting surface 50 and second surface 35. In this embodiment, both compensator surfaces 25 and 35 are curved. Therefore, both first and second surfaces 25 and 35 have non-zero power.

Also shown in FIG. 4 are two retro-reflectors 40 and 55. Both retro-reflectors 40 and 55, as shown, include flat reflecting surfaces, each having zero power.

Although not shown, it will be appreciated that as another embodiment, in one of the compensator surfaces, only the first surface 25 has power while the second surface 35 is flat and of zero power.

In operation, incoming light (designated as input) enters beamsplitter 45 passing through input surface 20. The passing light is split into first beam 10 and second beam 15, by beamsplitting surface 50. The two beams 10 and 15 are shown in dashed and dotted lines, respectively. First beam 10 is reflected from beamsplitting surface 50 and second beam 15 is transmitted through beamsplitting surface 50.

Next, first beam 10 reflects from retro-reflector 40 back toward beamsplitter 45, enters beamsplitter 45 at input surface 20, and exits beamsplitter 45 through beamsplitter surface 50. It then enters compensator 30 through first surface 25 and exits through second surface 35, as an output beam.

Concurrently, second beam 15, after exiting beamsplitter 45 at beamsplitting surface 50, enters compensator 30 through first surface 25 and exits through second surface 35. It then reflects from retro-reflector 55, re-enters compensator 30 through second surface 35, and exits through first surface 25. Second beam 15 is then reflected from beamsplitting surface 50 of beamsplitter 45 toward the output, as shown.

The two split beams 10 and 15 reunite and propagate approximately in the same direction as an output beam, traveling toward an output detector (not shown) which detects interference between the two beams.

In the embodiment of FIG. 4, neither beamsplitter 30, nor compensator 45, nor the air space between the beamsplitter and the compensator is wedged. The term "wedged" is to be understood as referring only to non-parallel flat surfaces, not curved surfaces.

In FIG. 4, beamsplitter surface 50 is flat, as are retro-reflectors 40 and 55. It will be appreciated that each retro-reflector may be, for example, a cube corner or a flat mirror.

In the embodiment shown, beamsplitter 45 has power only on input surface 20. In accordance with the definition above, the power of beamsplitter 45 is given by $$\phi_{bs}=(n-1)C_{bs},$$

where $C_{bs}=1/R_{bs}$,
n is the refractive index of the optical medium,
$R_{bs}$ is the radius of curvature of input surface 20, and
the subscript, bs, is beamsplitter.

Figure 6:
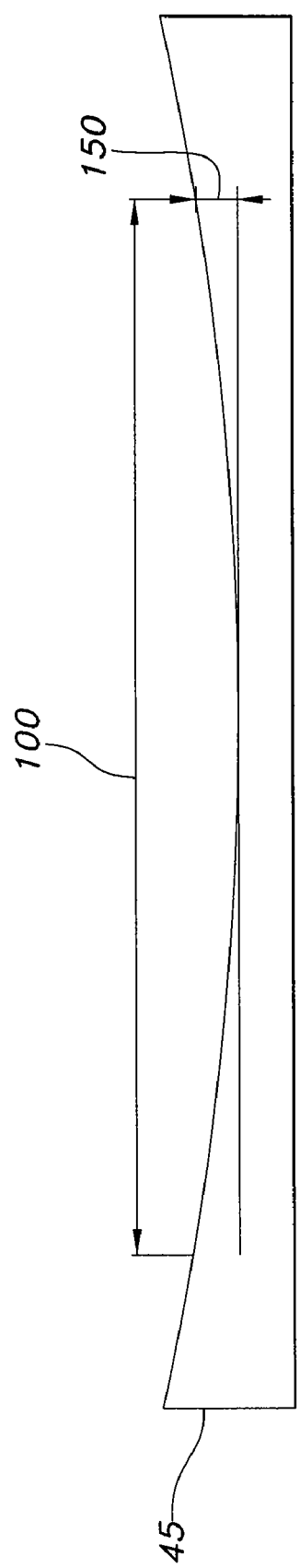
FIG. 6 shows details of a beamsplitter having a surface with power, including a pupil and a sag.

It will be appreciated that "sag" is defined in FIG. 6, as the height of a curve measured from the midpoint of a chord.

The power, $\phi_{bs}$, is chosen to yield phase variation from the center to the surrounding edge of pupil 100 of beamsplitter 45 to sufficiently break up the constructive multiple interference produced by etalon effects. FIG. 6 defines pupil 100 as the effective length across the light aperture of the curved surface of beamsplitter 45. As a numerical example, for an interferometer with a 50 mm diameter pupil using ZnSe optics, if $R_{bs}$=15 meters, the resulting sag, designated as 150, at the edge of the pupil is $25^2/2*15000$=20.8 microns. The internal optical path difference (OPD) of the beamsplitter is 2n*(sag) =100 microns or about 10 waves at $\lambda$=10 microns. If this is insufficient phase variation, the power may be increased accordingly.

In the embodiment of FIG. 4, compensator 30 has power on both surfaces 25 and 35. (Alternatively, the second compensator surface 35 may be flat). The total non-zero power of compensator 30, $\phi_{cp}$, is equal to the total non-zero power of beamsplitter 45, and in the embodiment shown in FIG. 4 is distributed between the two surfaces 25 and 35 instead of one surface. Therefore, $$\phi_{bs}=\phi_{cp}=(n-1)(C1-C2),$$

where C1 and C2 are the reciprocals of the radii of curvature of two surfaces 25 and 35, and
the subscript, cp, is compensator.

Second beam 15 sees $\phi_{bs}+3\phi_{cp}$ and first beam 10 sees 3 $\phi_{bs}+\phi_{cp}$. However, since the total powers of beamsplitter 45 and compensator 30 are equal, both beams 10 and 15 are subjected to the same total power and obtain the same wavefront. Consequently, higher interference fringe modulation efficiency results.

Figure 5:
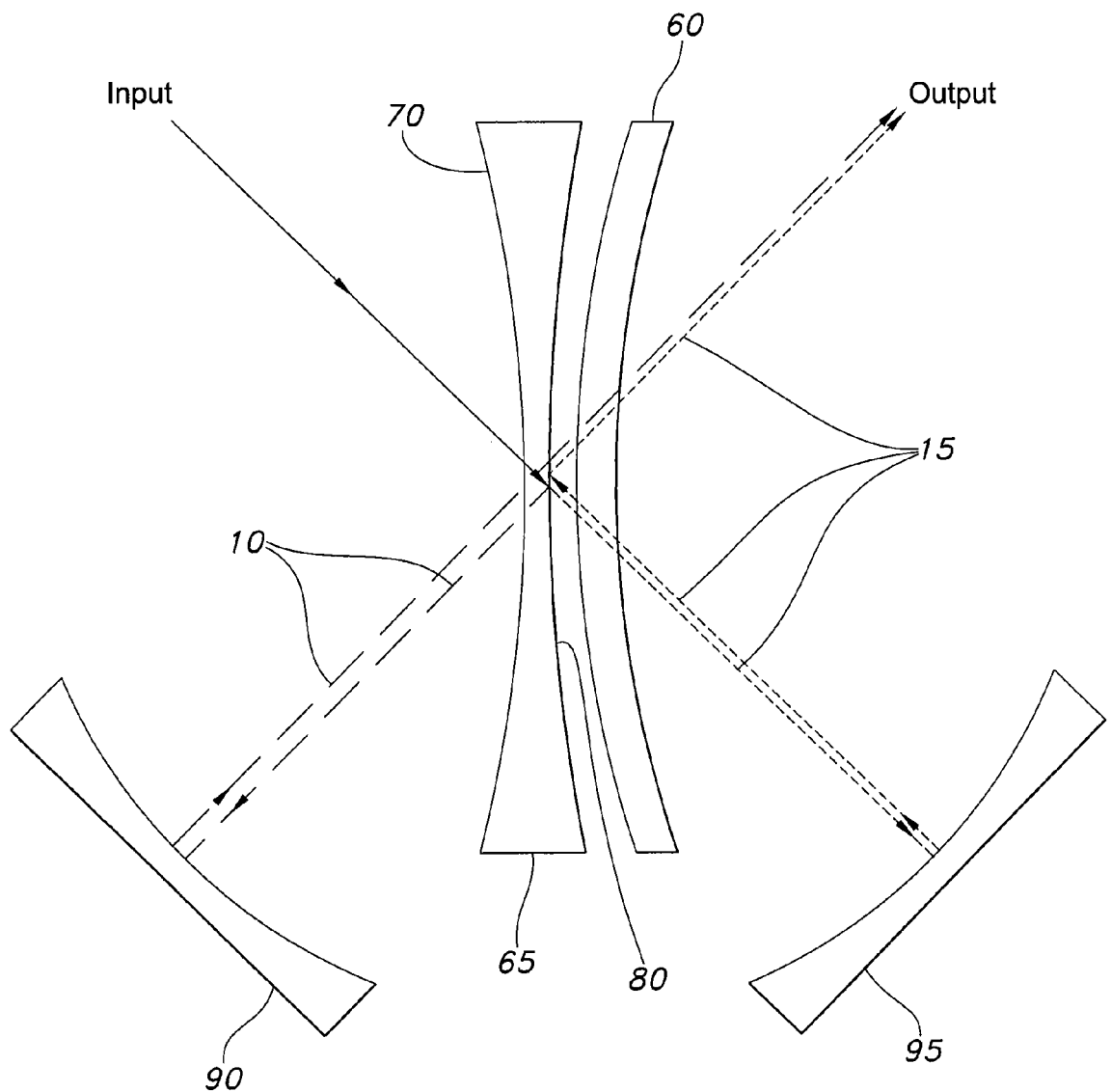
FIG. 5 shows portions of another interferometer including a beamsplitter and a compensator having non-zero power, resulting in reduced ghost image formation, in accordance with another embodiment of the invention.

FIG. 5 shows another embodiment of an interferometer having elements with non-zero power, in accordance with the present invention. As shown, the interferometer includes beamsplitter 65 and compensator 60. The beamsplitter 65 has input surface 70 and beamsplitting surface 80, each disposed opposite each other. Both input surface 70 and beamsplitting surface 80 have curved surfaces and, hence, both have non-zero power. Additionally, both retro-reflectors 90 and 95 have curved surfaces with non-zero power. The curved surfaces of the retro-reflectors are provided to partially compensate for the non-zero powers of beamsplitting surfaces 70, 80.

The surface powers of retro-reflectors 90 and 95 may have to be manufactured to a high degree of accuracy. This, however, is no more difficult than using a wedge with required thickness and angle tolerances in zero power interferometers. One advantage of this embodiment is that the ghost images are not displaced far from the primary beam and the ghost images are out of focus. Therefore, they are diffused over many focal plane elements and reduced in intensity. Their effects can also be calibrated away.

Similar to compensator 30 shown in FIG. 4, the two surfaces of compensator 60 are curved and have non-zero power.

It will be appreciated that the separation between the compensator and beamsplitter is not critical and may be used for other purposes. Sometimes, auxiliary subsystems are used to maintain alignment or monitor the optical path. These subsystems usually use a small part of the aperture (for example, 5 mm or less). Under these conditions, the air gap may be used to spatially separate ghost images from the primary path so that no overlap occurs. When no overlap occurs, no interference occurs. As a practical matter, preventing an overlap of the ghost in the primary paths requires a separation comparable to the diameter of the beams involved. For an 80 mm diameter system, for example, this is usually not possible unless extra space is available.

Although the invention is illustrated and described herein with reference to specific embodiments, the invention is not intended to be limited to the details shown. Rather, various modifications may be made in the details within the scope and range of equivalents of the claims and without departing from the invention.

What is claimed:
1. An interferometer comprising:
a beamsplitter, and
a compensator, wherein at least one surface of the beamsplitter and at least one surface of the compensator each has non-zero power and is curved, and the non-zero powers of the one surface of the beamsplitter and the one surface of the compensator are equal to each other for reducing constructive interference produced by etalon effects.

2. The interferometer of claim 1, wherein the other surface of the beamsplitter is a flat surface.

3. The interferometer of claim 1, further including
at least one retro-reflector having non-zero power.

4. The interferometer of claim 1, wherein
the one surface of the beamsplitter is curved having non-zero power, and another surface of the beamsplitter is a beamsplitting surface.

5. The interferometer of claim 1 wherein
the beamsplitter has opposing input and output surfaces, the input surface having a curvature $C_{bs}$, where $C_{bs}$ is the reciprocal of $R_{bs}$, and $R_{bs}$ is the radius of curvature of the input surface, the compensator has two opposing curved surfaces of C1 and C2, respectively, where C1 and C2 are the reciprocals of the respective radii of curvature of the two opposing curved surfaces, and the following relationships are provided:

$\phi_{bs} = \phi_{cp}$ where $\phi_{bs}$ is the power of the beamsplitter and $\phi_{cp}$ is the power of the compensator, and $\phi_{bs} = (n_{bs} - 1)C_{bs}$ $\phi_{cp} = (n_{cp} - 1)(C1 - C2)$, where n is the refractive index of the beamsplitter (bs) or the compensator (cp).

6. The interferometer of claim 5, wherein
the refractive index of the beamsplitter and the refractive index of the compensator are equal to each other, and $C_{bs} = C1 - C2$.

7. The interferometer of claim 1, wherein
the one surface of the beamsplitter includes a curved surface having non-zero power, and a pupil sized for receiving input light, the pupil size defined by a center and an edge surrounding the center, and the non-zero power of the one surface is configured to yield phase variation from the center to the edge of the pupil to break up constructive interference produced by etalon effects.

8. The interferometer of claim 7, wherein
a sag is formed between the center and edge of the pupil, and an optical path difference (OPD) is formed by the beamsplitter which has a value of 2n(sag), where n is the refractive index of the beamsplitter or the compensator, and sag is the height of the center of the pupil to a chord drawn to edges of the pupil.

9. An interferometer comprising:
a beamsplitter, and
a compensator, wherein the beamsplitter includes one surface having non-zero power and another opposing surface having zero power, the compensator includes two opposing surfaces each having non-zero power, and the combined non-zero power of the beamsplitter and the combined non-zero power of the compensator are equal to each other.

10. The interferometer of claim 9 wherein
incoming light is configured to pass through the one surface of the beamsplitter having non-zero power and next is configured to split into a first beam and a second beam at the other opposing surface of the beamsplitter, the first beam is configured to sequentially (1) pass through the one non-zero power surface of the beamsplitter toward a first retro-reflector, (2) reflect from the first retro-reflector, (3) pass again through the one non-zero-power surface, (4) pass through the other opposing surface of the beamsplitter, and (5) pass through the two opposing surfaces of the compensator as an output beam toward a detector, and the second beam configured to sequentially (1) pass through the two opposing surfaces of the compensator toward a second retro-reflector, (2) reflect from the second retro-reflector, (3) pass again through the two opposing surfaces of the compensator toward the other opposing surface of the beamsplitter, (4) reflect from the other opposing surface of the beamsplitter, and (5) pass again through the two opposing surfaces of the compensator as another output beam toward the detector.

11. A method for reducing the magnitude of ghost images in an interferometer, comprising the steps of:
forming a beamsplitter having two opposing surfaces and a compensator having two opposing surfaces; and curving one surface of the beamsplitter to form a non-zero power of the beamsplitter; and curving two opposing surfaces of the compensator to form a combined non-zero power of the compensator, wherein the combined non-zero power of the compensator is equal to the non-zero power of the beamsplitter.

12. The method of claim 11 further including the steps of:
inputting light into the interferometer,
outputting the light from the interferometer, after the light passes through the beamsplitter and the compensator, and measuring the output light for total power provided by the beamsplitter and the compensator.

13. The method of claim 11 further including the step of:
curving at least one retro-reflector of the interferometer, when the non-zero power of the beamsplitter and the non-zero power of the compensator are not equal to each other.

14. The method of claim 13 wherein
curving includes curving two retro-reflectors of the interferometer, when the non-zero power of the beamsplitter and the non-zero power of the compensator are not equal to each other.

* * * * *